United States Patent
Demey et al.

(10) Patent No.: US 8,802,003 B2
(45) Date of Patent: Aug. 12, 2014

(54) METHOD FOR THE PRODUCTION OF A REFRACTORY FILTER

(75) Inventors: Friedhelm Demey, Borken-Marbeck (DE); Renate Jahre, Gladbeck (DE); Hans Riethmann, Borken (DE); Mario Arruda, Sao Paulo (BR); Antonio Cassara, Sao Paulo (BR); Raphael Neto, Sao Paulo (BR); Fabio De Oliveira, Sao Paulo (BR); Sueli Pereira, Sao Paulo (BR); Kazuhiro Nakano, Toyokawa (JP)

(73) Assignee: Foseco International Limited, Derbyshire (GB)

( * ) Notice: Subject to any disclaimer, the term of this patent is extended or adjusted under 35 U.S.C. 154(b) by 329 days.

(21) Appl. No.: 13/138,619

(22) PCT Filed: Mar. 19, 2010

(86) PCT No.: PCT/GB2010/000503
§ 371 (c)(1), (2), (4) Date: Oct. 20, 2011

(87) PCT Pub. No.: WO2011/114080
PCT Pub. Date: Sep. 22, 2011

(65) Prior Publication Data
US 2012/0025434 A1 Feb. 2, 2012

(51) Int. Cl.
| | | |
|---|---|---|
| *C22B 9/02* | (2006.01) | |
| *B01D 39/20* | (2006.01) | |
| *C04B 38/00* | (2006.01) | |
| *C04B 35/524* | (2006.01) | |
| *C04B 35/626* | (2006.01) | |
| *C04B 38/06* | (2006.01) | |
| *C04B 35/565* | (2006.01) | |
| *C04B 111/00* | (2006.01) | |

(52) U.S. Cl.
CPC ..... *C04B 35/524* (2013.01); *C04B 2111/00793* (2013.01); *C04B 2235/3418* (2013.01); *B01D 39/2093* (2013.01); *C04B 38/0022* (2013.01); *C04B 35/6263* (2013.01); *C04B 2235/3217* (2013.01); *C04B 38/0615* (2013.01); *C04B 2235/3826* (2013.01); *B01D 2239/10* (2013.01); *C04B 35/565* (2013.01)
USPC .......................................... 266/230; 266/227

(58) Field of Classification Search
CPC ... B22C 9/086; B01D 39/2093; B22D 43/004
USPC ..................... 266/227, 230; 264/60
See application file for complete search history.

(56) References Cited

U.S. PATENT DOCUMENTS

| | | | |
|---|---|---|---|
| 4,568,595 | A | 2/1986 | Morris |
| 4,697,632 | A | 10/1987 | Lirones |

(Continued)

FOREIGN PATENT DOCUMENTS

| | | |
|---|---|---|
| CN | 87106034 A | 3/1988 |
| CN | 1287989 A | 3/2001 |

(Continued)

OTHER PUBLICATIONS

Machine translation of CN 200991617, pub Dec. 2007.*

(Continued)

*Primary Examiner* — Scott Kastler
(74) *Attorney, Agent, or Firm* — Nixon & Vanderhye, P.C.

(57) ABSTRACT

Method for the production of a closed edge refractory foam filter, by providing a reticulated foam substrate having at least one first surface for forming a side face of the filter and two opposed second surfaces for forming the through-flow faces of the filter, applying a liquid including an organic coating component to the first surface, solidifying the organic coating component to form a filter precursor having a continuous volatilizable coating on the first surface, and impregnating the filter precursor with a slurry containing particles of a refractory material, a binder and a liquid carrier. The impregnated filter precursor is dried and fired to form the filter having a closed edge.

6 Claims, 4 Drawing Sheets

(56) References Cited

U.S. PATENT DOCUMENTS

| | | |
|---|---|---|
| 4,808,558 A | 2/1989 | Park et al. |
| 5,147,546 A | 9/1992 | Tadayon |

FOREIGN PATENT DOCUMENTS

| | | | |
|---|---|---|---|
| CN | 200991617 | * | 12/2007 |
| CN | 200991617 Y | | 12/2007 |
| EP | 0 927 568 A1 | | 7/1999 |
| GB | 2 227 185 A | | 7/1990 |
| JP | 60-235778 A | | 11/1985 |
| JP | 2-229515 A | | 9/1990 |
| WO | WO 03/101584 A1 | | 12/2003 |

OTHER PUBLICATIONS

Yao, X., et al; "Effect of recoating slurry viscosity on the properties of reticulated porous silicon carbide ceramics"; *Ceramics International*, Elsevier, Amsterdam, NL LNKD—DOI:10.1016/J.Ceramint. 2005.01.008; vol. 32, No. 2, pp. 137-142 (2006) XP024914298.

Taslicukur, Z., et al; "Production of ceramic foam filters for molten metal filtration using expanded polystyrene"; *Journal of the European Ceramic Society*, Elsevier Science Publishers, Barking, Essex, GB LNKD—DOI:10.1016/J. Jeurceramsoc.2006.04.129, vol. 27, No. 2-3, pp. 637-640 (2006) XP005729634.

Japanese Office Action dated Nov. 26, 2013 (3 pgs), issued in Japanese Patent Application No. 2013-500569.

Text of the First Office Action issued in Chinese Patent Application No. 2010800179539, issued Dec. 9, 2013 with English Translation (13 pgs).

Decision on Grant, dated Jan. 22, 2014 issued in Russian Patent Application No. 2012144433/05(071367), dated Mar. 19, 2010 with English Translation (10 pgs).

* cited by examiner

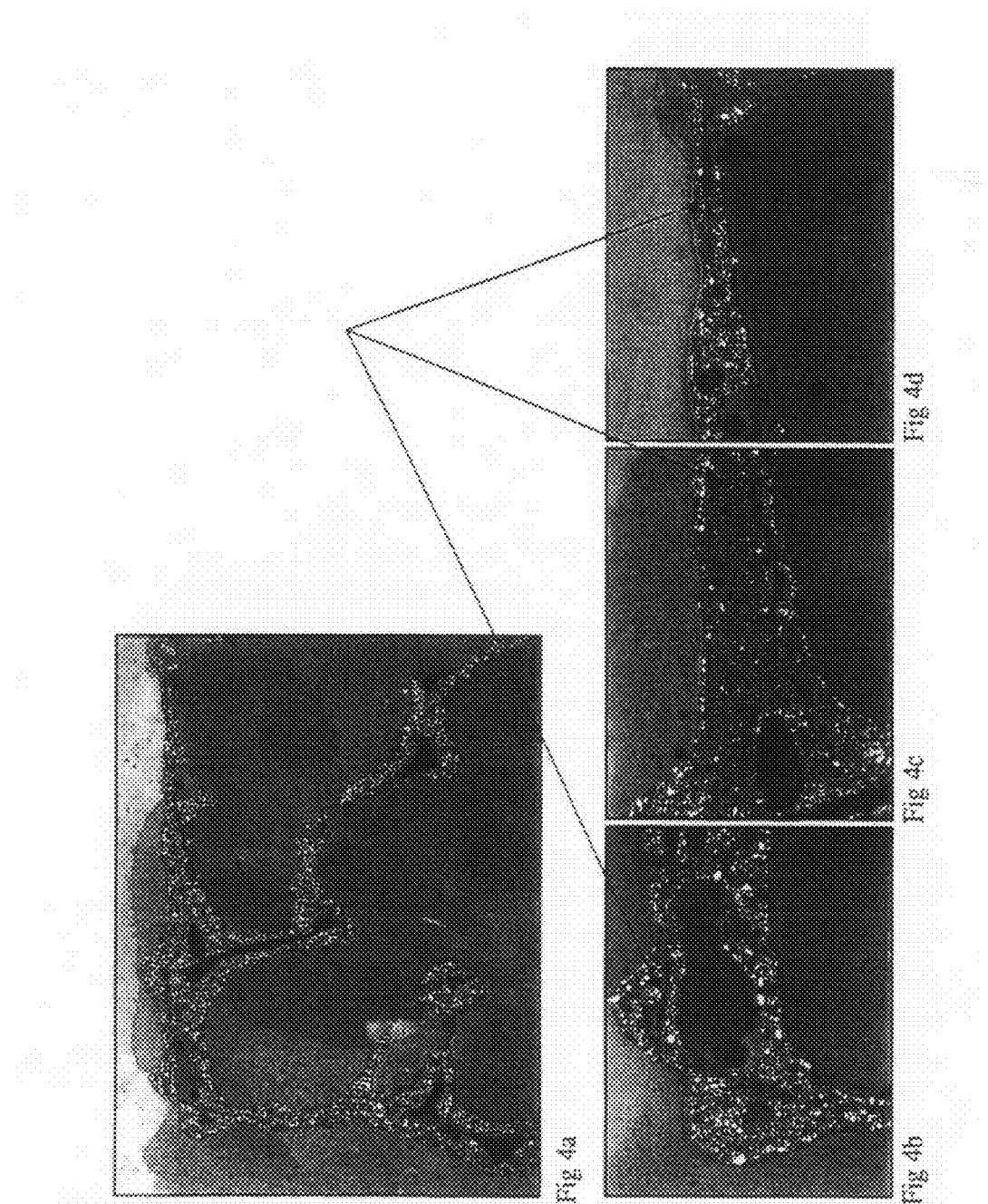

METHOD FOR THE PRODUCTION OF A REFRACTORY FILTER

This application is the U.S. national phase of International Application No. PCT/GB2010/000503 filed 19 Mar. 2010 which designated the U.S., the entire contents of which is hereby incorporated by reference.

The present invention relates to a method for the production of filters suitable for filtering molten metal and to filters made by such a method.

BACKGROUND OF THE INVENTION

Molten metals usually contain solids such as oxides of the metal and other impurities which may cause the final cast product to have undesirable characteristics. Filters have been devised to remove these impurities from the molten metal during the casting process. Normally these filters are made of refractory materials to withstand the high temperatures associated with molten metals.

One type of filter is a cellular filter which comprises a series of parallel ducts or passages for metal to pass through. Such filters are formed by extrusion or by stamping. Although they are robust and easy to handle, their filtration efficiency is relatively poor because the molten metal only travels a short and straight path through the filter.

The preferred refractory filters have a foam-like appearance and are referred to in the metal filtration industry as foam filters. These are usually ceramic foam filters but more recently carbon-bonded filters (where the refractory material is bonded by a material comprising a carbon matrix, as described in WO2002/018075) have started to become established for certain applications. A foam filter has a network of strands which define a plurality of interconnected open cells. Since the flowpath through such a filter is tortuous, the filtration efficiency is much higher than that of the cellular filters.

The fabrication of ceramic foam filters is described in EP 0 412 673 A2 and EP 0 649 334 A1. Typically; an open celled foam (e.g. reticulated polyurethane foam) is impregnated with an aqueous slurry of refractory particles and binder. The impregnated foam is compressed to expel excess slurry and then dried and fired to burn out the organic foam and to sinter the refractory particles and binder in the slurry coating. A solid ceramic foam is thereby formed having a plurality of interconnecting voids having substantially the same structural configuration as the starting foam. Although the filtration efficiency is much improved over the previously described cellular filters, ceramic foam filters are mechanically weaker (the strands, particularly at the edge of the filter are prone to breakage).

In use the filter may be placed in an opening in a wall between a molten metal inlet and a molten metal outlet to filter the metal. One example of the placement of a filter in a refractory wall is described in U.S. Pat. No. 4,940,489. Since the foam filters are porous in all directions and the edge surfaces are uneven, it is possible for some molten metal to flow around the edges of the filter or only pass through part of the filter, thereby reducing filtration efficiency. This problem is exacerbated if strand breakage has occurred during transport of the filter or during positioning of the filter in the refractory wall (it will be noted that the broken strands themselves can contribute to the impurities in the final casting).

Increasing the amount of slurry used to impregnate, i.e. coat the foam, in the production of the filter increases its strength but also results in reduced filtration efficiency due to the higher weight and reduced porosity.

The process of filtration requires the filter to be primed, in which the filter pores are filled with metal and a continuous flow of metal is achieved. Priming involves the displacement of air in the pores (at the surface of the filter) and the pressure required is inversely proportional to the size of the pores. In addition, temperature losses in the metal will increase metal viscosity hence filters with a high heat capacity will cause increased thermal losses and reduce priming. A heavier filter in which the coated strands are thicker is therefore undesirable since it will have a greater heat capacity. This means that the molten metal will need to be heated to a higher temperature to ensure that it does not freeze as it passes through the filter. This is disadvantageous from both an economic and environmental standpoint as it increases the amount of energy required to heat the metal to the required temperature.

In addition to the extra weight, filters produced using an increased amount of slurry will have reduced metal flow rates due to the increased strand thickness and smaller pores, and will have a greater tendency to block. Reduced flow rates and premature blockage can have adverse effects on metal casting, for example, by increasing pouring times or causing incomplete mould filling, and it may be necessary to increase the size of the filter or to increase the pore size of the foam. Increasing the level of slurry is therefore not a practical solution to increasing the strength of foam filters, particularly the edges of foam filters.

U.S. Pat. No. 5,039,340 describes a method for the manufacture of a foam filter where an adhesion promoting material, preferably together with flocking, is applied to the foam. The adhesion promoting material and flocking increase the amount of slurry that subsequently adheres to the foam. The end result is a stronger but heavier filter.

It has previously been proposed to provide the edges of the foam filter, which contact the wall of the mould/die, with a protective layer. The purposes of this protective layer can include enhancing mechanical strength, preventing the passage of metal between the mould or die wall and the filter (metal by-pass), and reducing the likelihood that the ends of the ceramic foam filter strands will break off during handling (particularly mechanical/robotic handling of filters) and transport. The protective layer also facilitates the use of robotic handling to allow automatic placement of the filters in moulds.

EP 0 510 582 A1 discloses a ceramic foam filter encased in a rigid frame of metal or ceramic. The ceramic framed filter can be made by wrapping an extruded strip of dough-like ceramic forming mass around the filter, which may or may not have been pre-fired, and then drying and firing.

CN 200991617Y discloses a ceramic foam filter having a protective layer of organic material around its edge which decomposes at high temperature during the use of the filter. The protective layer is said to reduce damage to the filter during transport and installation and also allow for its use in automatic production lines.

U.S. Pat. No. 4,568,595 relates to a ceramic foam filter having a ceramic coating. The coating is provided by trowelling, brushing or spraying a ceramic slurry over the fired ceramic foam filter and then firing the composite structure.

U.S. Pat. No. 4,331,621 describes a ceramic foam filter having an integrally bonded ceramic gasket secured to a peripheral surface thereof. It can be made by impregnating a flexible foam material with a slurry, placing it in a mould having the desired size of the final filter product and then feeding a ceramic fibre slurry into the gap between the foam material and the mould. The mould is then dried and fired to burn out the foam and sinter the ceramic material.

GB 2 227 185 suggests, in one embodiment, saturating a foam plastic starting piece with ceramic slip and then squeezing the foam to urge the surplus slip into a solid peripheral layer before firing. In another embodiment GB 2 227 185 proposes forming a closed layer on a ceramic foam filter by adhering either a further foam material or a web of fine plastic filaments to the foam. During impregnation with the slip, the small pores or intermediate spaces in the peripheral side edge region become, and remain, filled with slip, thereby forming the closed layer on firing. In both embodiments, the resulting coating is thick thereby reducing the useful volume of the filter and also increasing its heat capacity.

SUMMARY OF THE INVENTION

It is an object of the present invention to provide an improved method for the production of foam filters and improved filters made in this way. In particular, it is an object of the present invention to provide a method and filters which offer one or more of the following advantages:—
(i) a simplified method of production;
(ii) lower costs of production;
(iii) reduced friability filters;
(iv) increased porosity filters (and hence increased flow rate and capacity);
(v) greater handling strength filters;
(vi) easier installation of filters;
(vii) automatic (robotic) handling of filters;
According to a first aspect of the present invention there is provided a method for the production of a closed edge refractory foam filter, comprising:—
providing a reticulated foam substrate having at least one first surface for forming a side face of the filter and two opposed second surfaces for forming the through-flow faces of the filter;
applying a liquid comprising an organic coating component to the first surface;
solidifying the organic coating component to form a filter precursor having a continuous volatilisable coating on the first surface;
impregnating the filter precursor with a slurry comprising particles of a refractory material, a binder and a liquid carrier; and
drying and firing the impregnated filter precursor to form the filter having a closed edge.

A closed edge filter is a filter in which the pores in the edge (i.e. peripheral surface or side) of the filter are closed i.e. blocked. The filters described in U.S. Pat. No. 4,568,595 and U.S. Pat. No. 4,331,621 are examples of closed edge filters The term "edges" is commonly used by those skilled in the art to refer to the peripheral surfaces/sides of a filter.

The liquid must be applied to the foam substrate to provide a continuous volatilisable coating on the first surface(s) of the filter precursor so that after impregnation with slurry and firing, the resulting filter has a continuous closed edge. It will be understood that there may be small discontinuities in the volatilisable coating arising as a result of the method of application and the solidification of the organic coating. Small discontinuities in the filter closed edge may also arise, and as a result of any defects in the volatisable coating layer and the subsequent volatilisation of the organic coating component on firing the filter. Such discontinuities will make up no more than 5% of the area of the first surfaces that are coated.

The slurry adheres to both sides of the volatilisable coating as well as the foam substrate so that when it is fired, the volatilisable coating and the foam substrate volatilise to produce a unitary closed edge filter. By unitary it is meant that it is not possible to distinguish the end of a strand from the beginning of the coating. It will be appreciated that the unitary closed edge is different from the protective coating that is obtained by applying slurry to a filter that has already been fired, such as in U.S. Pat. No. 4,568,595 discussed above. In those cases, there will be a visible boundary between the strands of the filter and the closed edge.

The invention also resides in a refractory foam filter for filtering molten metal producible by the process of the first aspect, the filter comprising a three-dimensional network of strands of refractory material and having at least one side face and two opposed through-flow faces, the at least one side face having a unitary closed edge.

The process of the present invention allows the edge of the filter to be protected without building up the interior of the filter with unnecessary refractory material. Accordingly, this feature may be employed to produce filters that have either a lower weight/density or a higher porosity as compared to conventional filters, whilst maintaining or improving upon the properties (such as edge strength or friability) of the conventional filter.

According to a second aspect of the present invention, there is provided a refractory foam filter producible by the method of the first aspect, the filter comprising a three-dimensional lattice/network of strands of refractory material and having at least one side face and two opposed through-flow faces, the at least one side face having a unitary closed edge, characterized in that the unitary closed edge has a thickness of less than 1 mm.

According to a third aspect of the present invention, there is provided a refractory foam filter producible by the method of the first aspect, the filter comprising a three-dimensional lattice/network of strands of refractory material and having at least one side face and two opposed through-flow faces, the at least one side face having, a unitary closed edge, characterized in that the unitary closed edge comprises cavities.

In certain embodiments, the cavities are significantly longer in a direction parallel to the side face than they are wide in a direction perpendicular to the side face.

In a particular series of embodiments, the closed edge has a thickness of less than 0.7 mm, less than 0.5 mm, less than 0.45 mm, less than 0.4 mm, less than 0.35 mm or less than 0.3 mm. In another series of embodiments, the closed edge has a thickness of at least 0.15 mm, at least 0.25 mm, at least 0.35 mm, at least 0.45 mm, at least 0.55 mm, at least 0.65 mm, at least 0.75 mm, at least 0.85 m or at least 0.95 mm.

It will be understood that there will be variability in the thickness of the closed edge. As referred to herein, thickness is determined generally half way between adjacent surface nodes in the filter. A node is defined as a point in the irregular network of strands where two or more strands meet. The thickness may be determined by reference to a plurality of such measurements between different pairs of surface nodes.

The thickness of the closed edge may be compared to the thickness of the strands of the filter. In one embodiment the ratio of the thickness of the closed edge to the thickness of the strands is from 0.5 to 2:1 or from 0.75 to 1.75:1, or from 1 to 1.5:1.

In one embodiment, the filter of the present invention has a reduction in density of at least 10% as compared to an analogous conventional filter. In a further embodiment, the reduction is at least 15%, at least 18% or at least 20%.

The thermal and physical properties against which the filters are compared are to assess the filters' suitability for use. The filters must be able to withstand the thermal shock of being heated to high temperatures, physically withstand the mechanical shock from the impact of molten metal, allow sufficient molten metal to pass through the filter (i.e. filter priming and capacity), and have sufficient strength to withstand handling and transportation. The tests designed to measure these properties include friability, air and/or water flow rate, mechanical strength and molten metal impingement (as described herein).

As used herein a refractory foam filter is a filter capable of withstanding elevated temperatures (e.g. above 500° C. or even above 1500° C. in the case of filters for molten steel) having an irregular network or lattice of interconnecting strands that define interconnecting pores or voids therebetween such that multiple tortuous paths exist through the filter. Such foam filters are conveniently (but not necessarily) formed using a reticulated foam substrate, for example, as defined in the method of the present invention.

The reticulated foam substrate may be a polymeric foam, such as a polyether, a polyurethane (including polyether-polyurethane and polyester-polyurethane), or a cellulose foam. The reticulated foam substrate serves as a template for the resulting filter so its porosity provides an indication of the porosity of the resulting filter. Porosity may be defined in terms of the number of pores and the volume percentage of voids (pores) in the substrate. The porosity of a foam filter is usually specified in terms of number of pores per linear inch (ppi) and for metallurgical applications the porosity usually ranges from 5 ppi to 60 ppi, typically 10 ppi to 30 ppi for most foundry applications. In fact in the foundry industry, reference to the ppi of a filter is strictly speaking a reference to the ppi of the foam substrate from which it was made. The reticulated foam substrate of the present invention may have a porosity of from 5 ppi to 60 ppi, typically from 10 to 40 ppi or from 10 to 30 ppi.

The pores in the filter are not of uniform size (due to the structure of the foam substrate) and the pore size is further influenced by the method and level of impregnation of the foam. For example, the average pore size for a 10 ppi foam is typically in the range 4800 to 5200 microns, whereas the resulting filter produced from this foam will have an average pore size of the order 1200 to 1500 microns. Similarly for 30 ppi, the foam substrate has an average pore size of the order 2800 to 3200 microns whereas the average filter pore size is 650-900 microns. The overall porosity of a foam filter in terms of volume is typically in the region 75% to 90%.

The shape of the reticulated foam substrate is not critical and will generally depend on the intended application of the resulting filter. Commonly, the reticulated foam substrate will have a circular, square or rectangular cross section. A reticulated foam substrate having a circular cross section will have just one first surface whereas a reticulated foam substrate having a square or rectangular cross section will have four first surfaces.

The liquid may be applied to one or more first surfaces of the reticulated foam substrate. Commonly the organic liquid will be applied to all of the first surfaces of the reticulated foam substrate.

The liquid may be applied by spraying. Alternatively, the liquid may be applied using rollers or a brush or by submerging the edge of the filter in a body of the liquid.

The physical properties of the liquid will be partly determined by the method of application. When using rollers, brush or dipping, the solids content and viscosity should be adjusted so as to give sufficient tack to adhere to the precursor and completely close the lateral pores, promoting a smooth surface coating with minimal penetration of the liquid into the interior of the precursor. The liquid (containing the organic coating component) should also have good and rapid skin coating properties so as to minimise slumping and maintain a regular and even coating layer.

Application by spraying allows for greater control of coating thickness and therefore allows the minimum amount of organic coating component to be used. As with the other coating methods, spraying also requires the liquid to have good skin coating properties, plus a low viscosity to facilitate spraying.

The volatilisable coating may be built up by applying additional amounts of liquid, to ensure that a continuous coating is obtained. This can be necessary when applying the liquid by spray and several applications may be required. The total liquid to be applied will depend upon the required properties of the volatilisable coating and the method of applying the liquid e.g. the properties of the spraying process.

After application to the reticulated foam substrate, the organic coating component may be dried and hardened at room temperature. In some embodiments, drying is accelerated by a drying at an elevated temperature, e.g. at 80 to 140° C. The organic coating component when solidified (e.g. dried or cured) forms a volatilisable coating that is compatible with the subsequent impregnation steps and eventually burns off during firing (i.e. volatilises) so that it is not present in the resultant filter. In a particular embodiment, the organic coating component solidifies to form a flexible volatilisable coating. By 'flexible', it is meant that the coating is pliable and durable; capable of being flexed or bent without cracking, breaking or becoming detached from the reticulated foam, and that it returns to and retains its shape when any applied pressure is removed. This feature is particularly important if the filter precursor is impregnated with slurry using a method requiring compression (squeezing) to remove excess slurry.

The liquid may be the organic coating component itself or the liquid may comprise the organic coating component together with other components such as solvents, curing agents and pigments. In one embodiment the liquid is non-aqueous.

Solidification of the organic coating component to form the volatilisable coating may be by simple drying of the liquid comprising the organic coating component (evaporation of solvents) at room temperature or by the application of heat and/or airflow or by curing of the organic coating component, e.g. on exposure to moisture in the atmosphere or via an addition of a chemical accelerator or by a combination of one or more of these.

The organic coating component may be a polymeric material such as polyurethane, polyvinyl chloride (PVC), polyester (PET, PVA), polystyrene, mixtures of two or more polymer types and copolymers. In one embodiment the organic coating component forms an elastomer on drying. The above mentioned organic coating components are considered to be particularly useful since they are known to form a durable elastomer on drying.

The organic coating component may be, for example, a single component system or a two component system mixed shortly prior to applying to the reticulated foam substrate.

The liquid may comprise an organic solvent to dilute the organic coating component. The solvent should not adversely affect i.e. dissolve the foam substrate and should readily evaporate at room temperature. Depending upon the chemical nature of both the substrate and the coating, a wide variety of solvents may be suitable, classes include ethers such as tetrahydrofuran (THF) and diethyl ether, hydrocarbons such as pentane, cyclopentane and xylol, ketones such as acetone and methyl ethyl ketone, esters such as ethyl acetate and fluorinated/chlorinated hydrocarbons. In a particular embodiment, the liquid comprises a solvent selected from acetone, THF, ethyl acetate, xylol and mixtures thereof.

In a certain embodiment, the organic coating component is a single component moisture curing polyurethane, diluted to the required viscosity with a ketone/ether solvent blend.

The liquid may comprise a pigment to colour it. This provides a useful indicator of the amount of liquid that has been applied to the first surface(s) and assists in ensuring that the surface has been fully coated.

The refractory material may be selected from zirconia, zircon, silica, alumina (including brown fused alumina), talc, mica, titania, silicon carbide, zirconium carbide, titanium carbide, calcium carbide, aluminium carbide, silicon nitride, aluminium nitride, nickel oxide, chromic oxide, magnesia, mullite, graphite, anthracite, coke, active carbon, graphite-magnesia, graphite-alumina, graphite-zirconia, zirconium boride, calcium boride, titanium boride, frit (ground glass) and mixtures comprising two or more of these.

The particles of refractory material employed can be for example, powders, fines, granules, fibrous materials or microspheres (hollow and/or solid). In one embodiment, fibrous materials constitute up to 5% of the refractory material employed. Such small addition of fibrous material are known to improve the mechanical strength and thermal resistance of the filter.

Small additions of other materials may be added to the slurry to modify the mechanical and thermal properties of the resulting filter. In one embodiment, other materials, such as metal powders and metal alloy powders, are present in an amount equivalent to up to 5% of the weight of the refractory material. Suitable materials include steel, iron, bronze, silicon, magnesium, aluminium, boron.

The binder may be any conventional binder employed in the production of refractory foam filters. The binder may be an inorganic binder such as a silicate glass (e.g. borosilicate, aluminosilicate, magnesium silicate) or phosphate glass, or a carbon-rich source selected from one or more of the following classes of materials: pitches, tars, and organic polymers that degrade to form carbon on pyrolysis in a non-oxidising atmosphere.

The skilled person will be able to select the appropriate refractory material or mixture of refractory materials according to the particular mechanical and thermal requirements of the filter. For example, glass bonded alumina and alumina/graphite mixtures are regularly used for the filtration of aluminium alloys, glass bonded aluminium and silicon carbide mixtures are regularly used for iron filtration and glass bonded zirconia is used for steel filtration, whereas carbon-bonded alumina and graphite mixtures are used for both iron and steel filtration.

The liquid carrier in the slurry can be any suitable liquid diluent, for example water, methanol, ethanol or light petroleum. However, water is usually employed since it provides slurries having good coating properties and is environmentally safe.

Other materials may also be added to the refractory slurry to modify its rheological properties. The use of such materials in the preparation of filters is well known in the art, and they include suspension aids such as clays, anti-foaming agents such as silicone based liquids, polymeric stabilisers and dispersants.

The impregnation of filter precursors by refractory slurry is well known in the art, and may be by immersion of the precursor into the slurry and/or by rolling the slurry onto and into the precursor and/or spraying, removing any excess slurry by pressing and/or rolling and/or centrifuge.

One or more additional coats of a refractory material and/or a binder, optionally with liquid carrier, may be applied to the filter precursor and these additional coats may be dried.

BRIEF DESCRIPTION OF THE DRAWINGS

Embodiments of the invention will now be described by way of example only with reference to the accompanying drawings in which:—

FIG. 4a to FIG. 4d are SEM images of a filter in accordance with an embodiment of the invention.

DETAILED DESCRIPTION OF THE INVENTION

Figure 1:
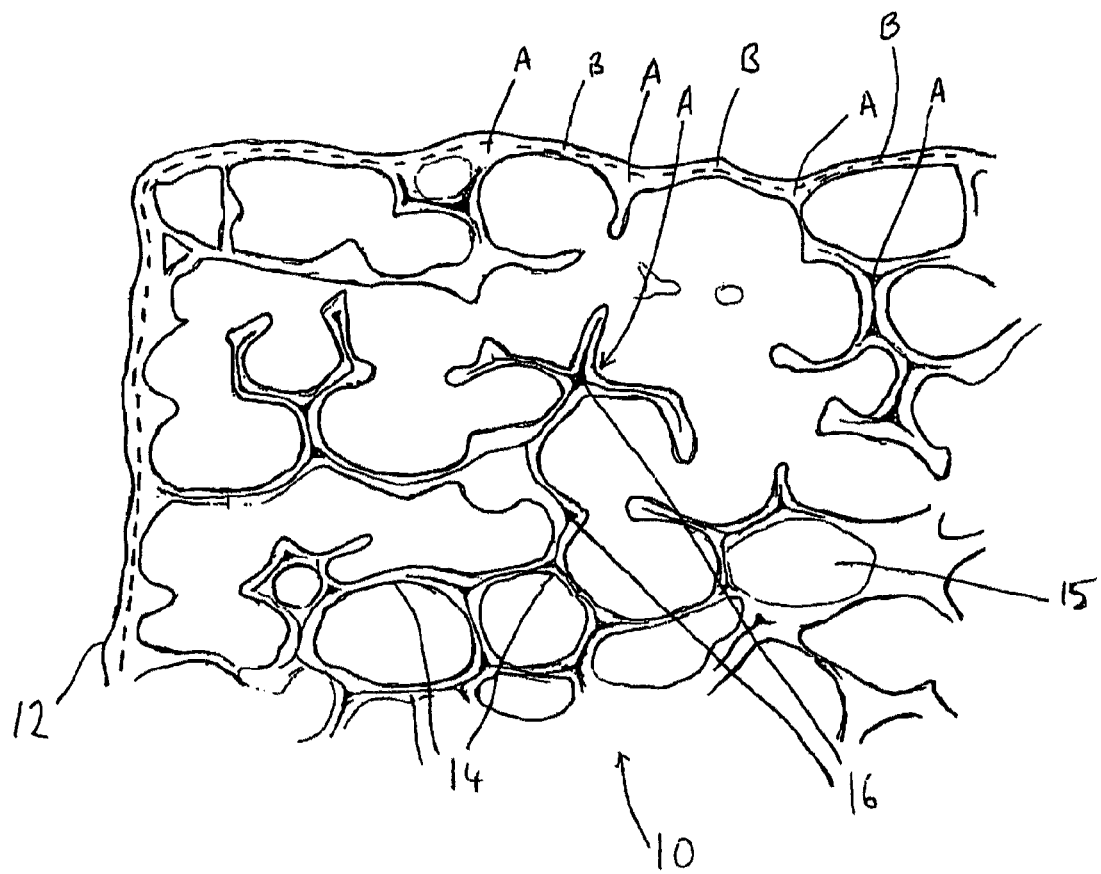
FIG. 1 is a schematic diagram of a cross-section of part of a filter in accordance with an embodiment of the invention.

FIG. 1 is a highly schematic cross-section of part of a filter 10 in accordance with the present invention. The filter 10 has a closed peripheral edge 12 and comprises an irregular network of strands 14 surrounding and defining pores/voids 15. Both the closed edge 12 and the strands 14 are slurry formed from a refractory material. The strands 14 have cavities 16 due to the reticulated foam burned out (volatilising) during firing of the filter precursor. Cavities would also be present in the closed edge 12 where the volatilisable coating was previously present. These would be located along the dotted line.

A node may be defined in the filter where two or more strands 14 meet. Some of the nodes in the filter have been labelled A. The thinnest part of the closed edge 12 is at the midpoint between two surface nodes. Examples of the midpoint have been labelled B. It can be seen that the thinnest point of the closed edge 12 is of comparable thickness to the strands 14.

Methodology

Preparation of Standard Silicon Carbide Foam Filter

A reticulated polyurethane foam piece having a square cross-section was impregnated with refractory slurry using a combination of rollers and spraying until a desired weight was achieved. The slurry comprised approximately 60% silicon carbide, 15% alumina, 5% silica, 10% rheology modifiers (anti-foams, dispersants, stabilisers, binders etc.) and 5-10% water. The amount of water added was adjusted so as to give the required slurry viscosity.

The impregnated foam piece was then dried in an oven at 150° C. before being fired. The firing was conducted in a tunnel (continuous) kiln, the temperature not exceeding a maximum 1200° C. at the hottest zone in the kiln.

Preparation of Closed Edge Silicon Carbide Foam Filter

A polyurethane foam piece having a square cross-section was spray coated on its four lateral sides (side faces) with a liquid comprising a non-sag single component moisture curing polyurethane adhesive, diluted with a ketone/ether solvent blend to a 15% dry solids solution and coloured via a 5% addition of a compatible pigment. The liquid was applied using a standard-type pistol spray gun with pressure can, and a 5 bar atomisation (air) pressure and 2 bar liquid supply pressure. Several layers were applied to the side faces until the liquid coating layer on the foam piece was continuous. The edge coated foam piece was then left to dry at room temperature.

The edge coated foam piece was used to prepare a foam filter using the same method that is described above in relation to the standard foam filter except that a lower application rate of slurry was used when preparing the filters of the invention. The amount of slurry applied (application rate) was reduced by lowering the viscosity and solids content of the slurry by dilution, and/or by adjusting the ratio of roller:spray application until the desired weight was achieved, whilst maintaining uniform coverage of the foam. After application of the slurry, the impregnated edge coated foam piece was dried and then fired in the same way as the standard foam filter.

Evaluation of Filters

The following measures were employed in order to evaluate the properties of the filters. It will be understood that the tests are for the purpose of comparison and so it is important that the same parameters are used for all filters that are tested.

Average Weight

The weight for a given number of samples was measured and a mean calculated. As described previously, there is a compromise between using enough slurry to provide sufficient strength and allowing good priming and filtration efficiency. In general, a lower weight filter will be preferable so long as the filter is sufficiently robust in use.

Water Flow Rate Test (Capacity)

The water flow rate test is an internally designed apparatus in which water is circulated and passes through a vertical steel tube in which a filter is sealed at the bottom and perpendicular to the flow so that the water flows down onto the face and through the filter. The apparatus is arranged so that the diameter of the area of the filter face exposed to the water is 40 mm, for all filters tested. The height (head) of water above the filter is 125 mm and the average flow rate of water through the filter is measured. The test is used to compare the expected relative flow rates (capacity) of various filters so as to give an indication of how the filters will perform with molten metal. The values quoted are the average of results from testing a number of filters.

Pressure Drop Test (Capacity and Priming)

The pressure drop test is a standard test for filters in which the drop in air pressure across a filter is determined by use of a manometer. The filter is sealed in a print within the test rig to which is connected a constant flow air pump. An inlet valve is used to vary the flow of air and a flow meter connected to the outlet end to record the flow rate through the rig. A manometer is linked to the rig on either side of the sample and measures the drop in pressure of the air passing through the filter. The apparatus is arranged so that the surface area of the filter face exposed to the air varies according to filter size, as does the air flow. For 50 mm×50 mm, 75 mm×75 mm and 100 mm×100 mm filters, the exposed areas and flow rates are 2025 mm$^2$, 4096 mm$^2$, 6400 mm$^2$ and 40 m$^3$/hour, 57 m$^3$/hour, 100 m$^3$/hour respectively. Similar to the water flow rate test, pressure drop testing is used for comparative purposes to indicate the relative flow characteristics through a filter. It is believed that generally, the lower the pressure drop, the easier it is for metal to prime and pass through a filter. The values quoted are the average of results from testing a number of filters.

Friability Measurement

Two methods of measuring the friability of the filters were employed. In the first, the weight of filter fragments that broke off a filter during the automated packaging stage of a commercial filter production plant was measured. A packed carton of filters was opened and each filter removed. Any broken, loose fragments were separated from the filters and collected together with any fragments remaining in the box and packaging. The friability value is then given by the total weight of the loose fragments as a percentage of the total weight of the filters.

An alternative and more severe test involved placing six filters in a 200 mm diameter metal pan with lid, and then fixing this on a standard sieve shaker. The vibrating base was turned on (speed setting number 3) and the metal can vibrated for 3 minutes. After three minutes, the filters were removed from the pan and any loose fragments were separated. The filters were then returned to the pan and vibration was repeated for a further period of 3 minutes. The pan was then removed, and the friability value calculated as described above by separating and weighing the total weight of the loose filter fragments.

Direct Impingement Test (Mechanical Strength Measurement)

The filters were tested with molten iron using a direct impingement test, in which 50 kg of grey iron at a given temperature was poured from a bottom pour ladle fitted down a 450 mm sprue onto the face of a filter supported on two opposing sides in a print made out of resin-bonded sand. The test provides a measure of the mechanical strength of the filter from the initial metal impact, thermal shock resistance, the mechanical strength at temperature and the resistance to erosion. The temperature for testing may be varied according to the thickness of the filter being tested and the required severity, for example a temperature of 1530° C. is a more severe test of a filter's performance than using metal at 1480° C. After testing (and cooling) the filter is inspected, and it is designated as failing if it has a hole completely through it. A maximum number of five filters are tested for each sample, and the result is considered a "Pass" if at least four filters pass (a fifth filter is not tested if the first four pass). In addition, the filter is examined to see the level of erosion and if there are any cracks in the filter.

Cold Crush Strength

The cold crush strength of the filters was measured using a Hounsfield compression strength tester. The test sample was placed centrally on test base and a plunger of known diameter moved downwards towards the sample at a constant rate of 50 mm per minute until the sample was crushed. The values quoted are the average of results from testing a number of filters.

Comparative Example 1

Standard Silicon Carbide Foam Filter

Filters having the dimensions 50 mm×50 mm×22 mm were prepared from 10 ppi reticulated polyurethane foam pieces having the appropriate dimensions using the method described above.

Figure 2A:
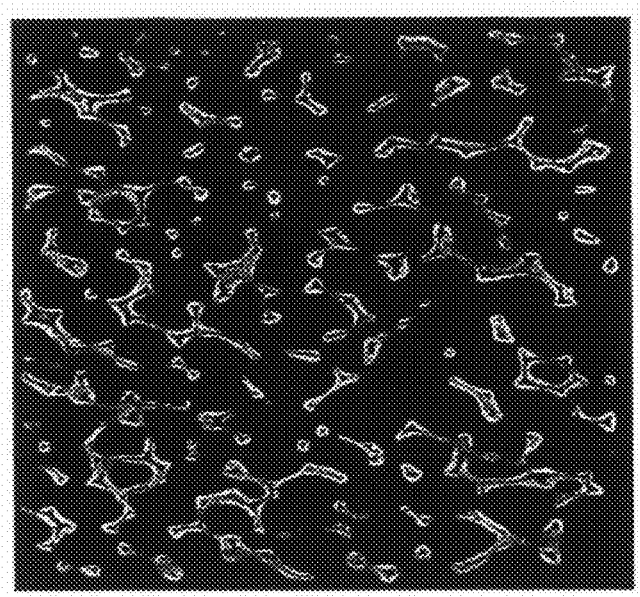
FIG. 2a is a cross-section of a conventional filter obtained using CT X-ray imaging and FIG. 2b is a negative of the same image.
Figure 2B:
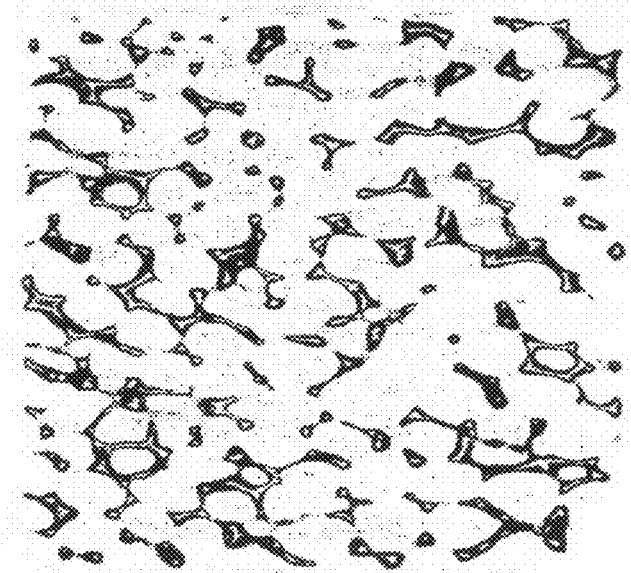

FIG. 2a is a cross-section of an entire filter of Comparative Example 1 which has dimensions 50 mm×5 mm×22 mm. The irregular arrangement of refractory strands may be seen clearly as the light areas against the dark background. The refractory strands comprise cavities where the reticulated foam has burned out during firing. These are seen as dark regions within the light coloured strands. For the sake of clarity, a negative of this image is shown in FIG. 2b in which the strands of refractory material are shown as dark regions.

Example 1

Silicon Carbide Foam Filter with a Closed Edge Coating

A closed edge filter having the dimensions 50 mm×50 mm×22 mm was prepared from a 10 ppi reticulated polyurethane foam piece having the appropriate dimensions (as described above). The application rate of slurry was reduced as compared to Comparative Example 1.

Figure 3A:
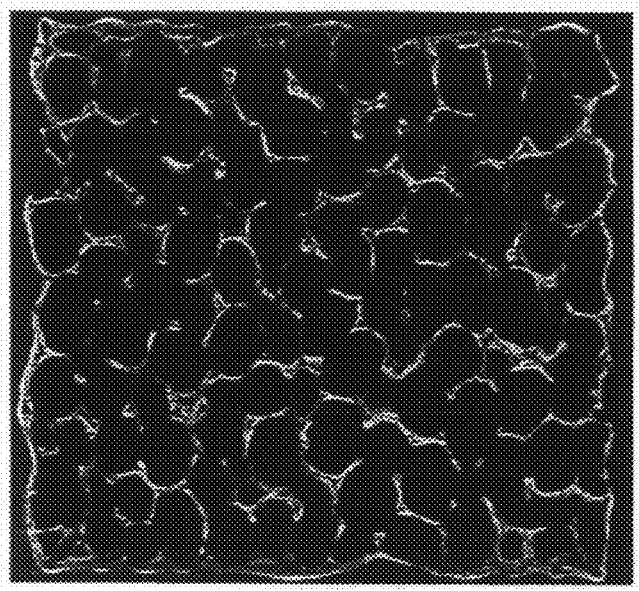
FIG. 3a is a cross-section of a filter in accordance with an embodiment of the invention obtained using CT X-ray imaging and FIG. 3b is a negative of the same image.
Figure 3B:
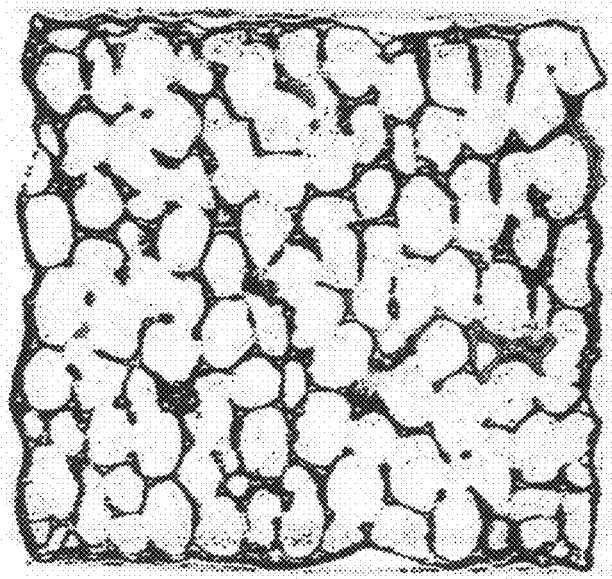

FIG. 3a is a cross-section of the entire filter of Example 1 which has dimensions 50 mm×5 mm×22 mm. The irregular network of strands of refractory material can be seen clearly together with the continuous closed edge. The closed edge filter is seen as the light regions and the pores/voids as the dark areas. The coating and the strands have a similar thickness, i.e. the ratio of the diameter of the edge coating to the diameter of the strands is approximately 1:1. For the sake of clarity, a negative of this image is shown in FIG. 3b in which the refractory material is shown as dark regions.

FIG. 4a is a scanning electron microscope (SEM) image of a corner portion of the filter of Example 1 and FIGS. 4b, 4c, and 4d are magnified images of the same portion. In each case, the line represents 1 mm. The thickness of the closed edge varies from a maximum of about 1 mm at the nodes to less than 0.5 mm at the midpoint between the nodes. The closed edge is of comparable thickness to the strands and, at some points, it is noticeably thinner than the strands. The closed edge comprises cavities since the volatilisable organic coating has been burned out during firing. Several long narrow cavities are visible which show where the volatilisable coating was located before firing. These have been highlighted by arrows in each of figures b, c, and d. Since the volatilisable coating was continuous, it might have been expected that one continuous cavity would have resulted instead of a discontinuous cavity. The inventors believe that the numerous cavities result because the refractory composition of the dried slurry is hardening but remains fluid whilst the coating is being volatilised and so can move to fill the gaps as they are being created.

Results

The mechanical, physical and thermo-mechanical properties of the filters of Comparative Example 1 and Example 1 are shown below.

TABLE 1

|  | Comp Ex 1 | Ex 1 |
| --- | --- | --- |
| Average Filter Weight (g) | 19.5 | 15.9 |
| Average Filter Density (g/cm³) | 0.39 | 0.32 |
| Water Flow Rate (l/s) | 1.81 | 2.03 |
| Friability (%) | 0.016 | 0.005 |
| Direct Impingement Test (1530° C.) | Pass | Pass |
| Direct Impingement Test (1510° C.) | Pass | Pass |

Average Filter Weight

The average weight (and density) for a filter of the invention (Example 1) was 18.5% lower than the average weight for a prior art filter (Comparative Example 1) with open edges.

Water Flow Rate Test (Capacity)

The water flow rate of Example 1 was approximately 11% greater than Comparative Example 1, indicating that the filter will have a higher metal flow rate and capacity in use. Example 1 had a lower level of slurry impregnation than Comparative Example 1 and hence a lower filter weight, resulting in a filter with greater porosity (thinner strands and fewer blocked pores).

Friability Measurement

Friability was measured using the first test described above (conventional packing line). The measurement showed that Example 1 was less friable i.e. that the closed edge protected the ends of the filter strands and thus reduced the amount of fragments breaking off, despite the fact that the strands were thinner (less refractory loading) and thus weaker overall than in Comparative Example 1.

Direct Impingement Test (Mechanical Strength Measurement)

Using the standard test, all of the Example 1 filters passed, showing no signs of failure i.e. breakage. The results being the same as the Comparative Example 1 show that despite the lower filter weight (impregnation level) the closed edge filters of Example 1 remain suitable for the filtration of molten metal.

Accordingly the closed edge filter provides an advantage over the prior art filter. The edge of the filter is protected without the need to build up the interior part of the filter and indeed, the impregnation level of the filter interior can be reduced. As a consequence of this, the flow rate and capacity of the filter can be increased, and in some instances, it will be possible to produce a filter with smaller pore sizes whilst maintaining the flow rate and capacity of a standard foam filter with large pore sizes. This means that filtration efficiency can be increased without adversely affecting the overall casting (mould filling) process.

Comparative Examples 2 and 3 and Examples 2 and 3

Conventional and closed edge filters having dimensions 50 mm×50 mm×15 mm were prepared from polyurethane foam pieces. Comp Ex 2 and Ex 2 were prepared from 20 ppi pieces and Comp Ex 3 and Ex 3 were prepared from 30 ppi pieces. The properties of the filters are listed below.

TABLE 2

|  | Comp Ex 2 (20 ppi) | Comp Ex 3 (30 ppi) | Ex 2 (20 ppi) | Ex 3 (30 ppi) |
| --- | --- | --- | --- | --- |
| Overall Average Filter Weight (g) | 15.2 | 15.1 | 12.6 | 14.6 |
| Water Flow Rate (l/s) | 1.94 | 1.81 | 2.08 | 1.90 |
| Direct Impingement Test 1510° C. | Not Tested | Not Tested | Pass | Pass |
| Direct Impingement Test 1480° C. | Pass[1] | Pass[1] | Not Tested | Not Tested |
| Average Cold Crush Strength (N) | 701 | 797 | 320 | 569 |

Note
[1] product specification (and result) of commercial product

As expected, the 20 ppi filters had a higher water flow rate than the 30 ppi filters, due to the larger pore size. Ex 3 has a pore size of 30 ppi and yet has a comparable water flow rate to the 20 ppi conventional filter (Comp Ex 2).

The Ex 2 and Ex 3 filters passed direct impingement testing at a higher (hence more severe testing) temperature than the specification of the current commercial product Comp Ex 2 and Comp Ex 3. Together, the results mean that an Ex 3 filter could be used in place of Comp Ex 2, providing the greater filtration efficiency of a 30 ppi filter together with the capacity normally associated with a lower ppi product.

Comparative Examples 4 and 5 and Examples 4 and 5

Conventional and closed edge filters having dimensions 50 mm×50 mm×22 mm were prepared from polyurethane foam pieces. Comp Ex 4 and Ex 4 were prepared from 20 ppi pieces and Comp Ex 5 and Ex 5 were prepared from 30 ppi pieces. The properties of the filters are listed below.

TABLE 3

|  | Comp Ex 4 (20 ppi) | Comp Ex 5 (30 ppi) | Ex 4 (20 ppi) | Ex 5 (30 ppi) |
| --- | --- | --- | --- | --- |
| Overall Average Filter Weight (g) | 19.6 | 19.4 | 17.1 | 18.4 |
| Friability (%) (Packing Test Method) | 0.013 | 0.011 | 0.010 | 0.007 |
| Water Flow Rate (l/s) | 1.64 | 1.60 | 1.97 | 1.77 |
| Direct Impingement Test 1530° C. | Pass[1] | Pass[1] | Pass | Pass |
| Average Cold Crush Strength (N) | 750 | 745 | 403 | 517 |

Note
[1] product specification (and result) of commercial product

Both of the filters of the invention show improved (reduced) friability despite having lower filter weights and cold crushed strengths than the conventional filters. They also have greater water flow rates than the conventional filters indicating that they will have a greater capacity in use when filtering metal. Ex 5 may be used in place of Comparative Ex 4 in order to provide greater filtration efficiency whilst maintaining flow rate.

Comparative Example 6 and Example 6

Conventional and closed edge filters having dimensions 75 mm×75 mm×22 mm were prepared from polyurethane foam pieces having a porosity of 20 ppi. The properties of the filters are listed below.

TABLE 4

|  | Comp Ex 6 (20 ppi) | Ex 6 (20 ppi) |
| --- | --- | --- |
| Average Filter Weight (g) | 44.0 | 37.7 |
| Water Flow Rate (l/s) | 2.09 | 2.59 |
| Direct Impingement Test 1530° C. | Not Tested | Pass |
| Direct Impingement Test 1510° C. | Pass[1] | Not Tested |
| Average Cold Crush Strength (N) | 970 | 535 |

Note
[1] product specification (and result) of commercial product

Comparative Examples 7 and 8 and Examples 7 and 8

Conventional and closed edge filters having dimensions 100 mm×100 mm×22 mm were prepared from polyurethane foam pieces. Comp Ex 7 and Ex 7 were prepared from 20 ppi pieces and Comp Ex 8 and Ex 8 were prepared from 30 ppi pieces. The properties of the filters are listed below.

TABLE 5

|  | Comp Ex 7 (20 ppi) | Comp Ex 8 (30 ppi) | Ex 7 (20 ppi) | Ex 8 (30 ppi) |
| --- | --- | --- | --- | --- |
| Average Filter Weight (g) | 90.5 | 90.6 | 77.4 | 74.4 |
| Water Flow Rate (l/s) | Not Tested | Not Tested | 2.16 | 2.59 |
| Direct Impingement Test 1510° C. | Pass[1] | Pass[1] | Pass | Pass |
| Average Cold Crush Strength (N) | 1225 | 1196 | 738 | 873 |

Note
[1] product specification (and result) of commercial product

Comparative Example 9 and Examples 9A, 9B and 9C

Conventional and closed edge filters having dimensions 50 mm×50 mm×15 mm were prepared from polyurethane foam pieces having a porosity of 20 ppi. A different slurry composition was used compared to previous examples, comprising approximately 55% silicon carbide, 15% alumina, 10% silica, 10% rheology modifiers and binders and 5-10% water. The amount of slurry applied was adjusted to produce a range of filters having different weights. The impregnated foam pieces were dried as previous examples, however, the firing of the filters was conducted in a batch kiln, reaching a maximum 1150° C. at the highest point of the firing cycle.

The friability of the filters was measured using the second method and is shown below together with other properties of the filters.

TABLE 6

|  | Comp Ex 9 | Ex 9A | Ex 9B | Ex 9C |
| --- | --- | --- | --- | --- |
| Average Filter Weight (g) | 15.4 | 12.6 | 14.9 | 17.6 |
| Friability (%) (Sieve Shaker Test) | 0.14 | 0.26 | 0.14 | 0.04 |
| Pressure Drop (Pa) | 271 | 181 | 197 | 248 |
| Direst Impingement (1510° C.) | Pass | Pass | Not Tested | Not Tested |
| Average Cold Crush Strength (N) | 1301 | 552 | 703 | 967 |

The results show that increasing the impregnation level, and hence filter weight, increases the strength and reduces the friability of the filters. Furthermore, Ex 9B has a similar overall weight to Comp Ex 9, however, since it also has a closed edge, the impregnation of the foam body i.e. coated strand thickness is less. The filter will therefore have a higher capacity and higher flow rate compared to a standard filter, as indicated by the lower pressure drop value, but with no increased friability of the filter (edges).

Compared to Comp Ex 9, Ex 9C has a higher overall filter weight, however the level of strand impregnation is lower as indicated by the pressure drop data. It will therefore be expected to have a slightly higher capacity and metal flow rate compared to the conventional filter. In addition, as a result of its significantly improved (reduced) friability, Ex 9C will be more resistant to breakages and hence be particularly robust to mechanical (including robotic) handling.

Examples 10, 11 and 12

Closed edge zirconia based filters were prepared from polyurethane foam pieces having the same dimensions as those used to produce Examples 6 (Example 10) and 7 (Examples 11 and 12). The slurry composition comprised approximately 75% zirconia, 10% magnesia, 10% rheology modifiers and binders and 5-10% water. The impregnated foam pieces were dried as in previous examples. The zirconia filters were fired at a higher temperature than the previous silicon carbide filters, reaching a maximum 1600° C. at the highest point of the firing cycle conducted in a batch kiln. The results are shown below.

TABLE 7

|  | Ex 10 | Ex 11 | Ex 12 |
| --- | --- | --- | --- |
| Foam Porosity | 20 ppi | 10 ppi | 20 ppi |
| Average Filter Weight (g) | 72.6 | 159.7 | 143.1 |
| Pressure Drop (Pa) | 208 | 421 | 451 |
| Average Cold Crush Strength (N) | 3973 | 5307 | 3268 |

Examples 13 and 14 and Comparative Examples 13 and 14

20 ppi closed edge silicon carbide filters and standard filters were prepared as described previously and evaluated in a horizontally parted mould. For each test, twenty sets of steering knuckle castings were cast, two per moulding box, one filter per casting. Two different series of castings were produced, with a larger filter being used for the larger/heavier casting type. The results are shown below.

TABLE 8

|  | Comp Ex 13 | Ex 13 | Comp Ex 14 | Ex 14 |
| --- | --- | --- | --- | --- |
| Dimensions (mm) | 50 × 50 × 22 | 50 × 50 × 22 | 50 × 75 × 22 | 50 × 75 × 22 |
| Average filter weight (g) | 19.5 | 16.2 | 30.3 | 24.7 |
| Water Flow Rate (l/s) | 1.6 | 2.1 | 2.0 | 2.3 |
| Average casting pouring time (s) | 11.7 | 11.0 | 12.6 | 11.9 |
| Average casting poured weight (kg) | 62.1 | 61.4 | 71.4 | 70.2 |
| Metal flow rate through filter (kg/s) | 5.3 | 5.6 | 5.7 | 5.9 |

The closed edge filters are considerably lighter that the corresponding standard filters. Furthermore, these results show that the closed edge filters have higher flow rates which gives a reduction in casting pouring times of approximately 6% compared to the equivalent standard filters. All castings appeared satisfactory on visual inspection, with no noticeable (filter related) defects.

The invention claimed is:

1. A method for the production of a closed edge refractory foam filter, comprising:—
    providing a reticulated foam substrate having at least one first surface for forming a side face of the filter and two opposed second surfaces for forming the through-flow faces of the filter;
    applying a liquid comprising an organic coating component to the first surface;
    solidifying the organic coating component to form a filter precursor having a continuous volatilisable coating on the first surface;
    impregnating the filter precursor with a slurry comprising particles of a refractory material, a binder and a liquid carrier; and
    drying and firing the impregnated filter precursor to form the filter having a closed edge.

2. The method of claim 1, in which the reticulated foam substrate has a porosity of from 5 to 60 pores per linear inch (ppi).

3. The method of claim 1, in which the liquid is applied to all of the first surfaces of the reticulated foam substrate.

4. The method of claim 1, in which the liquid is applied by spraying.

5. The method of claim 1, in which the volatilisable coating is flexible.

6. The method of claim 1, in which the organic coating component is selected from the group consisting of polyurethane, polyvinyl chloride (PVC), polyester (PET), and polystyrene.

* * * * *